July 9, 1957 — J. WASYLUK — 2,798,651
CANOPY CARRIER FOR STROLLERS
Filed Sept. 4, 1956 — 4 Sheets-Sheet 1
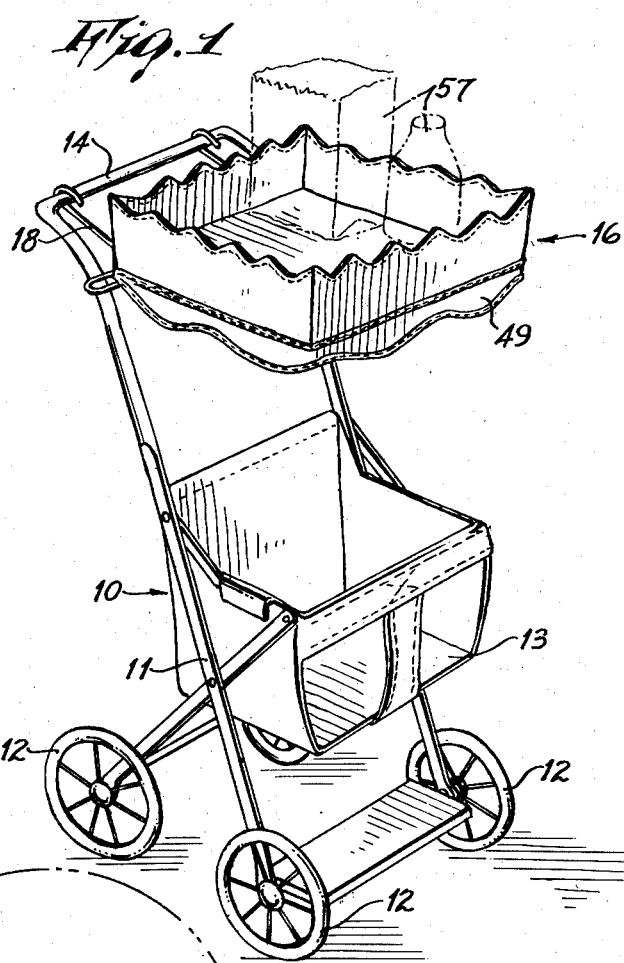
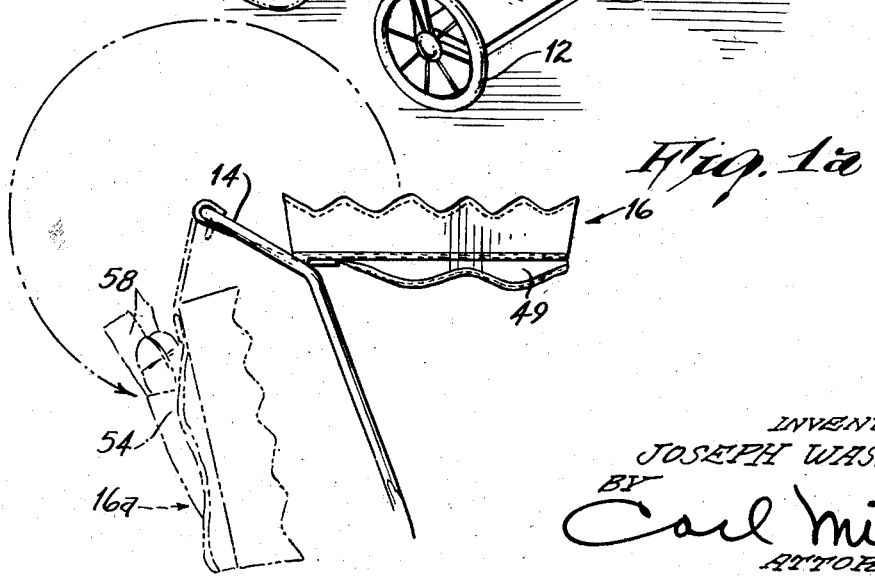
INVENTOR
JOSEPH WASYLUK
BY Carl Miller
ATTORNEY

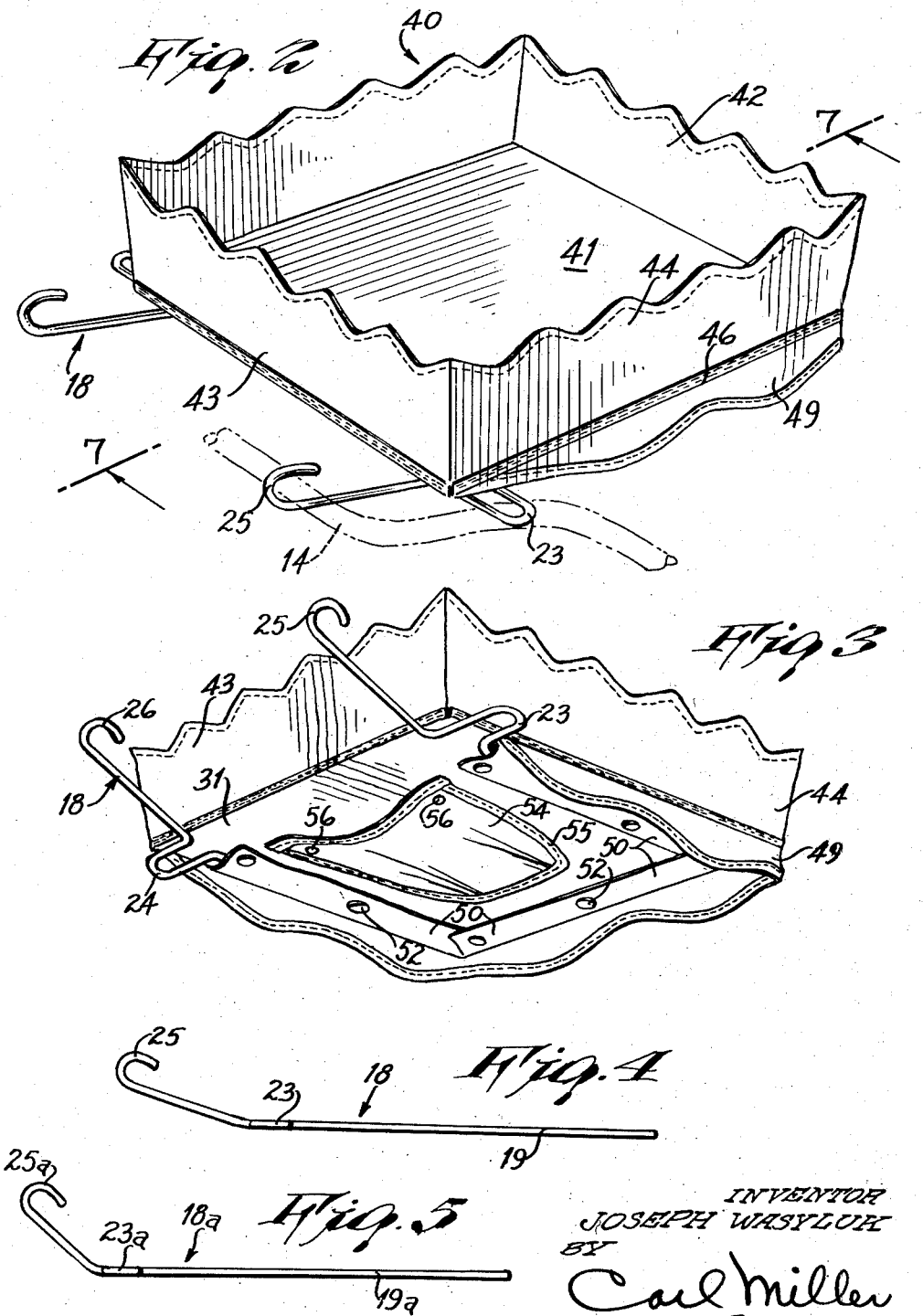

July 9, 1957 J. WASYLUK 2,798,651
CANOPY CARRIER FOR STROLLERS
Filed Sept. 4, 1956 4 Sheets-Sheet 3

INVENTOR
JOSEPH WASYLUK
BY
Carl Miller
ATTORNEY

July 9, 1957  J. WASYLUK  2,798,651
CANOPY CARRIER FOR STROLLERS
Filed Sept. 4, 1956  4 Sheets-Sheet 4
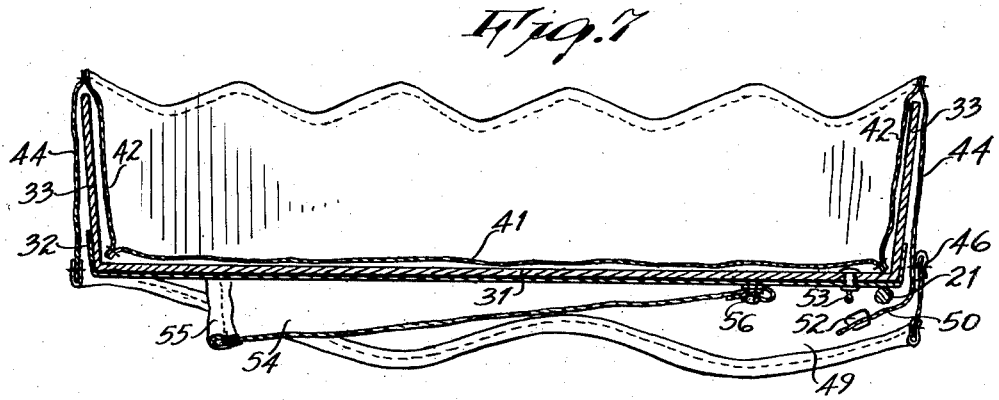
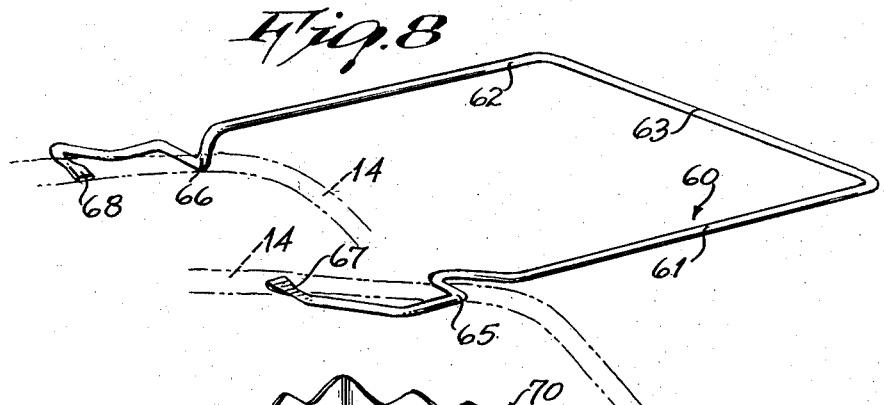
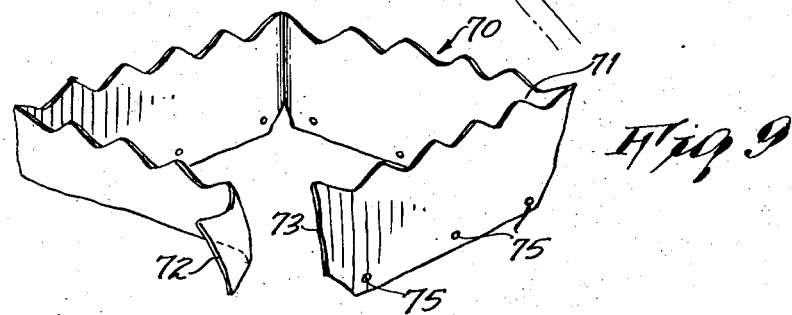
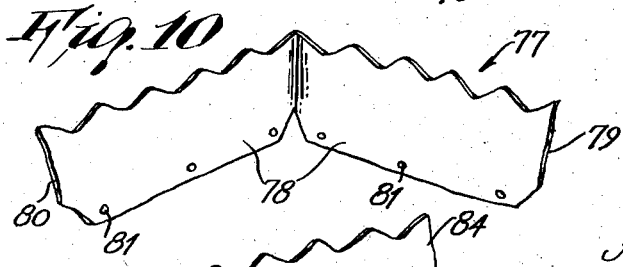
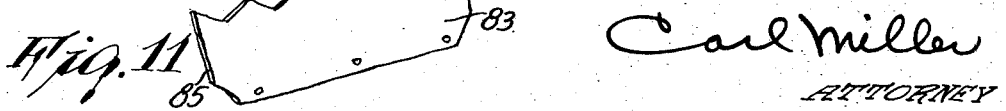
INVENTOR
JOSEPH WASYLUK
Carl Miller
ATTORNEY United States Patent Office 2,798,651
Patented July 9, 1957

2,798,651

CANOPY CARRIER FOR STROLLERS

Joseph Wasyluk, Jersey City, N. J.

Application September 4, 1956, Serial No. 607,796

5 Claims. (Cl. 224—42.46)

This invention relates to canopy construction and, more particularly, to canopy construction for strollers.

While various types of strollers and carriages have, heretofore, been provided with various types of pockets and pouches for carrying small articles, such pockets are usually inadequate to hold purchases from an ordinary shopping trip. As a result, the parent usually finds it quite awkward to push the stroller and carry large purchases. Aside from being inconvenient, this also endangers the safety of the child and the parent. An object of this invention therefore, is to provide a stroller having carrier means for bundles and packages and the like that is simple in construction, efficient in operation, and which will overcome the aforementioned difficulties.

Another object of this invention, is to provide a canopy for strollers that may be moved between an overhead shading position in which it is also arranged to support various packages, to a retracted position behind the seat of the stroller wherein it is adapted to store a smaller quantity of such packages in an associated pouch.

A still further object of this invention, is to provide a removable canopy construction that may be applied to various types of strollers and which is operative to both shield the child from the rays of the sun and to carry various articles on top thereof.

All of the foregoing and still further objects and advantages of this invention will become apparent from a study of the following specification, taken in connection with the accompanying drawing, wherein:

Figure 1 is a perspective view showing a stroller equipped with a canopy made in accordance with this invention;

Figure 1a is a fragmentary view similar to Figure 1, showing the device in a plurality of operative positions;

Figure 2 is an enlarged perspective view showing the top of the canopy;

Figure 3 is a bottom perspective view of the canopy shown in Figure 2;

Figure 4 is a side view of a support bracket used in the present invention;

Figure 5 is a modified form of the support bracket shown in Figure 4;

Figure 7 is a cross sectional view taken along line 7—7 of Figure 2;

Figure 8 is a perspective view of a still further modified form of support bracket; and Figures 9, 10, and 11, are perspective views of various modified forms of canopy liner constructions.

Figure 6:
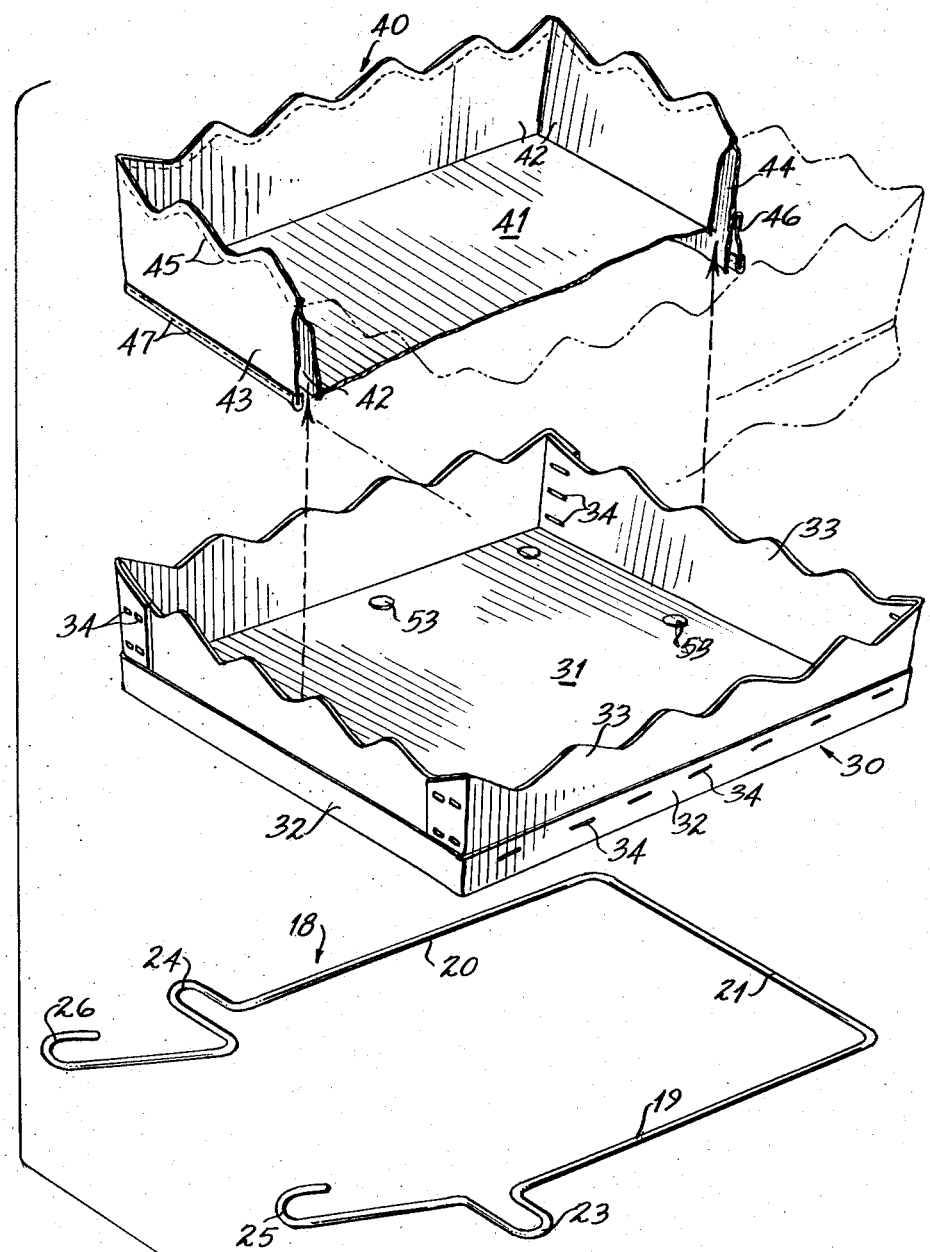
Figure 6 is an exploded view, in perspective, showing the assembly of the canopy.

Referring now to Figure 1 of the drawing, a canopy made in accordance with the present invention is shown in association with a stroller 10 having a framework 11 that is supported on four wheels 12 and which has a seat 13 for supporting a young child. The upper portion of the frame 11 terminates in a handle assembly 14 which is used to push the stroller. A canopy carrier 16, made in accordance with the present invention is rotatably mounted upon the horizontal bar of the handle.

As more clearly shown in Figure 6, the canopy carrier includes a substantially U-shaped support bracket 18 that has a pair of parallel side arms 19, 20, connected at their one end by a transversely extending base 21. The opposite ends of the arms terminate in arcuate hinge portions 25, 26 that are adapted to pivotally support the bracket upon the horizontal portion of the stroller handle. A substantially U-shaped bearing portion 23, 24, extends outwardly from each side arm of the bracket intermediate the respective ends thereof. A foundation carrier unit 30 is arranged to be supported upon the carrier bracket 18. This unit includes a flat floor 31 that is defined by upwardly turned side flanges 32 which extend around the periphery thereof. A somewhat higher scalloped side wall 33 is secured to the inside surface of each of the flanges 32, such as by staples 34, whereby a substantially rigid carrier unit is provided that may be readily covered by the liner cover 40.

The liner cover 40 is substantially of the same figuration as the foundation unit and includes a floor 41 defined by upturned side walls along the periphery thereof. Each of these side walls includes an inner ply 42 that has an outer ply secured thereto along the upper edge. The outer ply 43 of the back wall extends downwardly to the level of the inner ply, but the outer ply 44 of each of the other walls extends downwardly below the level of the inner ply and the floor 41. While the various side walls of the carrier and the liner have been shown to be scalloped in the drawing, it is to be understood that any desired configuration may be used, the respective edges of the inner and outer plies of the liner being secured togther by any suitable means, such as by stitching 45. Decorative edging material is secured to the lowermost extremity of the outer ply of the back wall 43 and to the outer surface of the outer ply 44 of the other walls along the level of the floor to present a tailored appearance. A downwardly extending scalloped skirt 49 is secured to the edging 46 that is attached to the lower extensions 50 of the outer ply 44.

As more clearly shown in Figures 3 and 7, a plurality of female snap members 52 are secured to the lower extensions 50, which members are arranged to cooperate with the male members 53 that are secured to the bottom surface of the floor 31 of the foundation unit 30. With the carrier bracket 18 disposed beneath the floor of the foundation unit 30, the lower extensions 50 of the liner cover are turned inwardly to bring the respective snap members into engagement with each other, thereby removably securing the bracket in operative position on the unit. A single flap 54 is secured to the central portion of the lower surface of the floor 31 of the foundation unit, such as by stitching 55, and reenforced at the upper corners thereof by rivets 56. The flap defines a pocket that opens rearwardly toward the outer ply 43 of the back wall of the carrier.

In assembling the respective parts of the canopy carrier, the removable liner cover 40 is applied to the foundation unit 30 in the manner shown in Figure 6. The carrier bracket 18 is then placed beneath the unit and removably secured thereto by the lower extensions 50 of the outer ply of the liner cover which are folded beneath the foundation unit and the snap members thereof engaged. The unit is mounted upon the handle 14 of a stroller or similar device, so that the hinge portions 25, 26, of the bracket are rotatably engaged with the horizontal handle portion. The outwardly extending bearings 23, 24, are adapted to engage with the adjacent portions of the stroller frame so as to maintain the canopy carrier in a horizontal position 16, as shown in Figure 1, in which position the carrier is adapted to support a plurality of packages 57 on the top thereof. Also, in this position the canopy is arranged to shield the child in the stroller from the rays of the sun or from the rain. By rotating the canopy in a counterclockwise direction, as viewed in Figure 1a, the canopy may be moved to an inoperative position 16a, wherein the flap pocket 54 may be used to carry a plurality of smaller packages 58.

Referring now to Figure 5, a modified form of supporter bracket 18a is shown, wherein the upper ends of the side arms 19a are provided with somewhat shorter extensions that terminate in the hinge portion 25a and between which extremities of the bracket are provided outwardly extending bearing portions 23a. This particular form of bracket is more suitable for other styles of strollers or coaches that have a handle portion having a more pronounced bend adjacent the upper extremity thereof. Referring to Figure 8 of the drawing, a still further modified form of support bracket 60 is shown that may be more permanently secured to the framework of the coach or stroller. In this form, the pair of parallel side arms 61, 62, are connected at one end by a transversely extending base 63 and terminate at their opposite ends in flanged connected portions 67, 68, that may be securely or permanently fastened to the handle 14 of the stroller. Intermediate the ends of the arms, are inwardly extending bearing portions 65, 66, that are adapted to engage with the upper surface of the handle so as to support the canopy carrier. In this form of bracket, the flanges 67, 68, may be engaged with the lower surfaces of the handle, whereby the resulting lever or toggle action is sufficient to maintain the bracket on the handles, even in the absence of a permanent or integral connection therewith.

The liner cover may be constructed in various ways. The side walls having the inner and outer plies may be constructed as a unit 70, in the form of a single strip that may be joined at its ends 72, 73, and to which the floor may be secured to the inside surfaces of the walls 71 thereof. Similarly, the lower extensions of the side flaps are provided with snap fastening members 75. In Figure 10, a unit 77 is shown that will provide two sides of the liner and which terminate in edges 79, 80, that may be secured to adjacent edges of a similar unit 77. Similarly, the lower extensions are also provided with snap fasteners 81. In Figure 11, a single side 83 having edges 84, 85, may be used in connection with three other similar units to provide the four wall liner cover to the inside of which, the floor may be secured.

While the foregoing construction has been described in connection with a full sized unit for use on strollers for children, it will be recognized that such may also be constructed in the form of a toy for use by children in playing with their dolls and furniture. Therefore, while this invention has been described with particular reference to the specific forms shown in the drawing, it is to be understood that such is not to be construed as imparting limitations upon the invention, which is best defined by the claims appended hereto.

Having thus described my invention, I claim as new and desire to secure by Letters Patent:

1. Canopy carrier construction for strollers comprising, in combination, a substantially U-shaped support bracket having a pair of parallel arms connected at one end by a transversely extending base and provided at the opposite end with a hinge bearing portion adapted to pivotally support said bracket upon the handle of a stroller, a substantially rigid and shallow foundation carrier unit having a floor and side walls and an open top adapted to be supported on said bracket, a liner cover of substantially the same configuration as the said foundation unit arranged to fit over and enclose said unit, and fastener means carried by said cover adapted to removably engage with the floor of said foundation unit to secure said bracket in assembly therewith.

2. A canopy carrier as set forth in claim 1, wherein each of said side walls of said liner cover comprises an inner ply and an outer ply connected together along their upper edges, the outer ply of all but one of said side walls extending vertically below and horizontally beneath the level of the floor of said foundation unit, and said fastener means comprising snap members secured to the lower surface of said unit floor and said lower extensions of said liner sidewalls.

3. A canopy carrier as set forth in claim 2, wherein said parallel arms of said carrier bracket are removably secured between said floor of said foundation unit and said lower extensions of said liner side walls.

4. A canopy carrier as set forth in claim 3, wherein said liner comprises a floor extending between the inner plies of said ends of said liner side walls, and said lower extensions of said liner side walls further comprise skirts secured to the outer surface thereof at substantially the same level as said liner floor and adapted to extend beneath said floor level to mask the attachment of said support bracket to said foundation unit and said liner cover.

5. A canopy carrier as set forth in claim 4, further comprising a pocket secured to the lower surface of said foundation unit floor opening toward said hinged bearing portions of said support bracket, said skirt being arranged to mask said pocket when said carrier is in a horizontal position, said pocket being adapted to support packages therein when said canopy carrier is rotated rearwardly about the axis of said hinge bearing portions of said bracket arms to a vertical position.

References Cited in the file of this patent
UNITED STATES PATENTS

| | | |
|---|---|---|
| 2,198,584 | Swably | Apr. 23, 1940 |
| 2,635,797 | Siebert | Apr. 21, 1953 |